United States Patent
Sueshige et al.

[11] Patent Number: 6,129,166
[45] Date of Patent: Oct. 10, 2000

[54] ELECTROMOTIVE CART

[75] Inventors: Hiroshi Sueshige; Masayuki Yamamoto; Naotoshi Ono; Tadayuki Yoneyama; Atsushi Miyazaki; Yasumi Fukuzumi; Yasunori Yamamoto; Hideyuki Sakamoto, all of Wako, Japan

[73] Assignee: Honda Giken Kogyo Kabushiki Kaisha, Tokyo, Japan

[21] Appl. No.: 08/957,659

[22] Filed: Oct. 24, 1997

[30] Foreign Application Priority Data

| Nov. 6, 1996 | [JP] | Japan | 8-294246 |
| Nov. 6, 1996 | [JP] | Japan | 8-294251 |
| Nov. 6, 1996 | [JP] | Japan | 8-294253 |
| Jan. 24, 1997 | [JP] | Japan | 9-011641 |

[51] Int. Cl.⁷ .................. B60K 1/00; B62B 3/00
[52] U.S. Cl. .............. 180/65.6; 280/651; 280/47.26
[58] Field of Search .................. 180/65.1, 65.6, 180/68.5, 19.1; 280/47.24, 47.26, 47.3, 47.31, 651, 652, 653, 659; 298/2

[56] References Cited

U.S. PATENT DOCUMENTS

| 2,401,796 | 6/1946 | Raitch | 180/19.1 |
| 2,545,735 | 3/1951 | Howard | 180/19.1 |
| 3,007,536 | 11/1961 | Overstreet | 280/47.3 |
| 4,270,622 | 6/1981 | Travis | 180/65 C |
| 4,759,232 | 7/1988 | Roberts | 74/710.5 |
| 4,811,988 | 3/1989 | Immel | 298/2 |
| 4,815,984 | 3/1989 | Sugiyama | 439/211 |
| 5,150,762 | 9/1992 | Stegeman et al. | 180/208 |
| 5,350,030 | 9/1994 | Mawhinney et al. | 180/19.3 |
| 5,413,735 | 5/1995 | Kruse et al. | 180/65.1 |
| 5,465,801 | 11/1995 | Hoover | 180/19.1 |
| 5,489,000 | 2/1996 | Hillbohm | 180/19.1 |
| 5,697,465 | 12/1997 | Kruse | 180/65.1 |

FOREIGN PATENT DOCUMENTS

| 2 615 459 | 11/1988 | France . |
| 2 624 466 | 6/1989 | France . |
| 2 661 881 | 11/1991 | France . |
| 43 07 341 | 9/1994 | Germany . |
| 51-31502 | 8/1976 | Japan . |
| 53-4294 | 2/1978 | Japan . |
| 63-247121 | 10/1988 | Japan . |

*Primary Examiner*—J. J. Swann
*Assistant Examiner*—Christopher Bottorff
*Attorney, Agent, or Firm*—Merchant & Gould P.C.

[57] ABSTRACT

A four-wheeled-electromotive cart includes a single motor and a direct axle driving mechanism for driving the axle of left and right front wheels by means of the motor. The single electric motor would cause no rotation speed difference between the left and right front wheels and hence constantly permits a smooth linear movement of the electromotive cart. The direct axle driving mechanism includes a relay shaft connected to the output shaft of the electric motor, a small-diameter bevel gear mounted on a lower end of the relay shaft, and a large-diameter bevel gear engaging with the small-diameter bevel gear. The front-wheel axle is spline-connected to the large-diameter bevel gear so as to be driven by the motor via the direct axle driving mechanism. Thus, the electromotive cart is allowed to smoothly start moving without sudden jolts or shocks caused by start of the motor rotation.

7 Claims, 15 Drawing Sheets

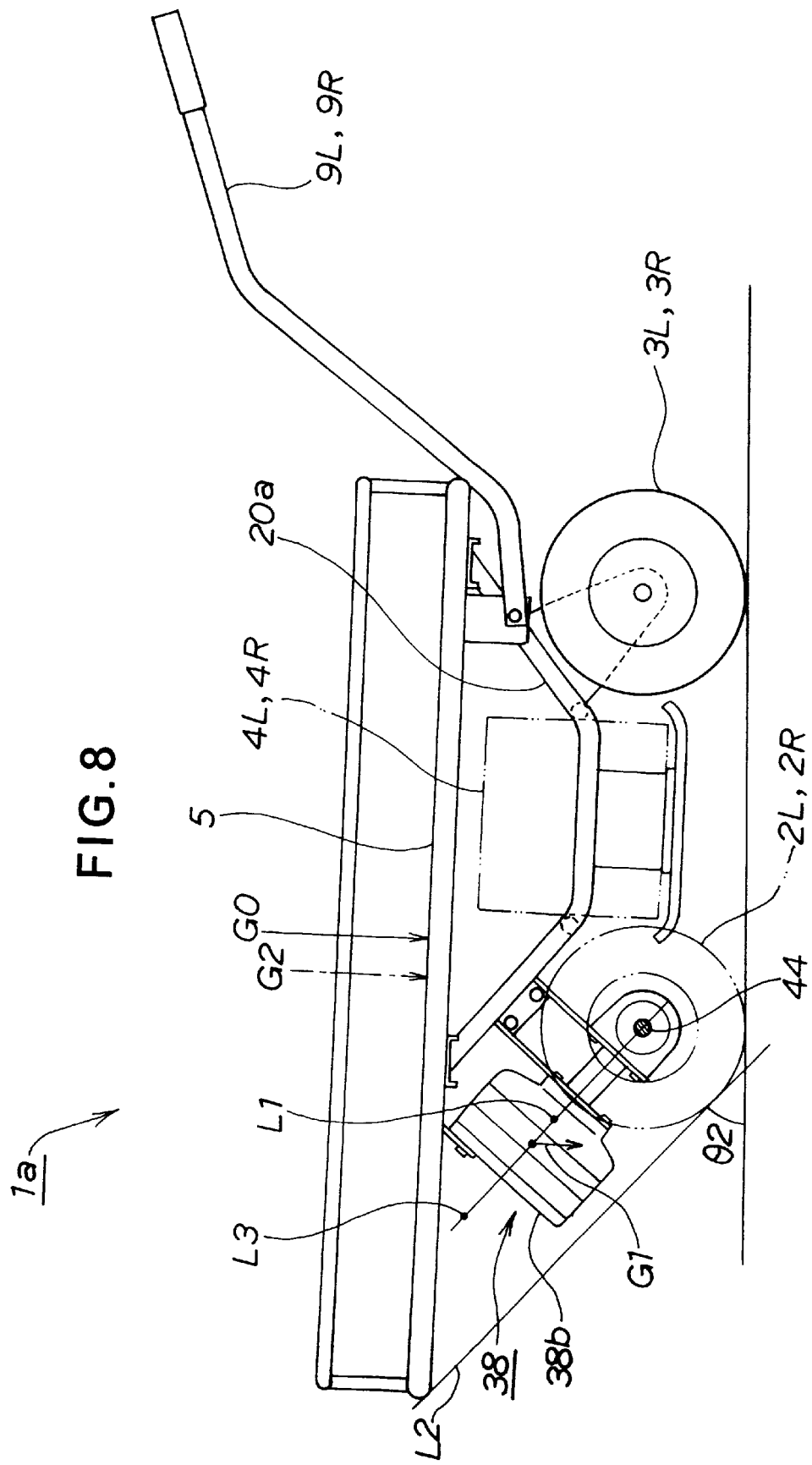

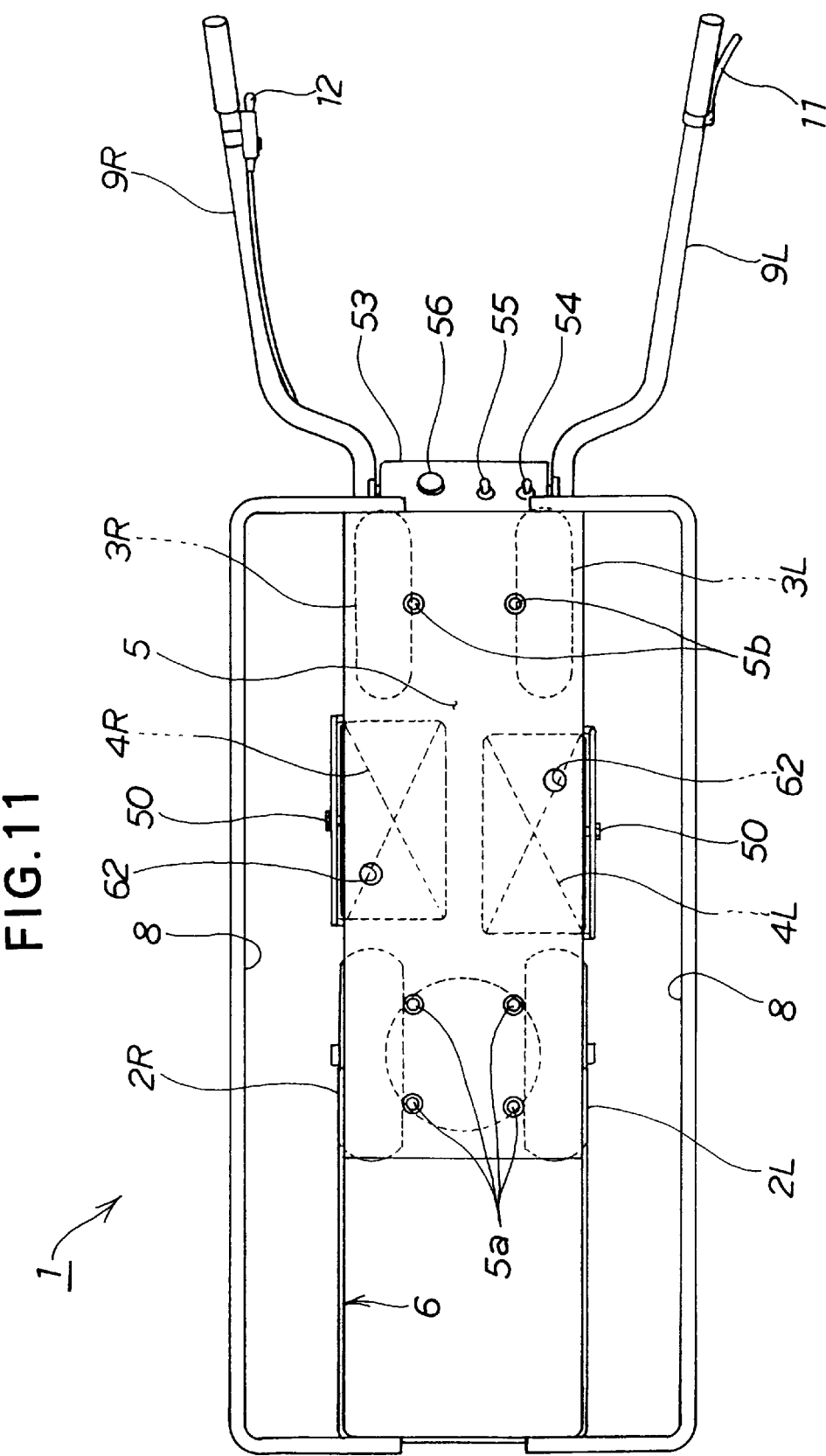

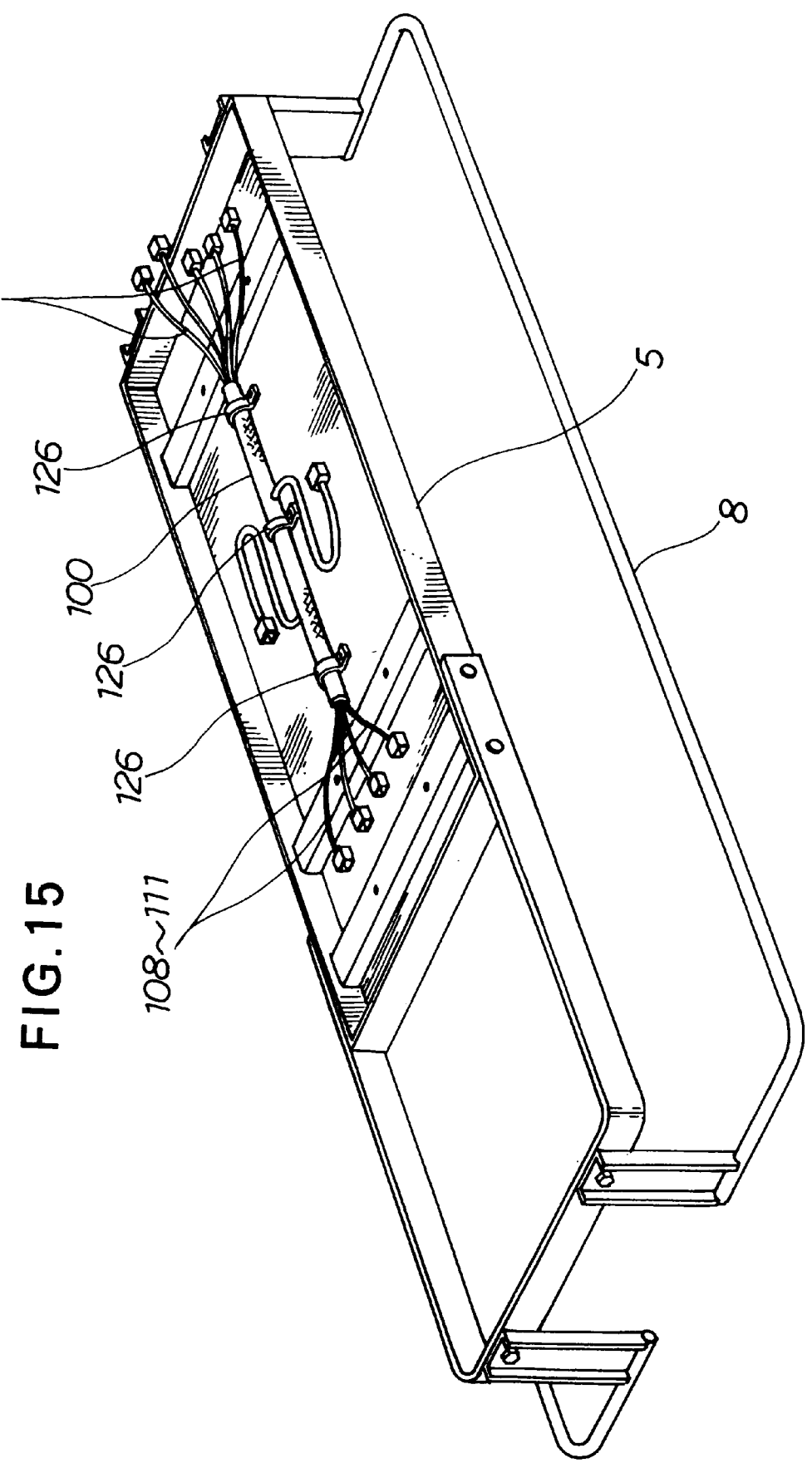

ELECTROMOTIVE CART

BACKGROUND OF THE INVENTION

1. Field of the Invention

The present invention relates to a four-wheeled electromotive cart with two front wheels and two rear wheels where the front wheels are driven via an electric motor.

2. Description of the Related Art

With present-day widespread use of vinyl plastic hothouses, melons are being widely grown even in cold-weather districts. In such vinyl plastic hothouses, which may be as large as 50–100 m in length, to anticipate a rich harvest, fertilization, transplantation of seedlings and crop harvesting is done by manual labor, only to a limited degree, and hence a high amount of mechanical assistance. So far, agricultural work in the vinyl plastic hothouses has been done using tractor, cultivator, etc. as the mechanical assistance, but these machines are not satisfactory from the viewpoint of working environment because their power source is an internal combustion engine (gasoline or diesel engine), and the hothouses become filled with exhaust gas from the engine. Also, because the tractor and cultivator are fundamentally agricultural machines for outdoor work, they are not easily handled in vinyl plastic hothouses of relatively small area.

To provide a solution to the foregoing inconveniences, a four-wheeled electromotive cart is proposed in Japanese Utility Model Publication No. 51-31502. The proposed electromotive cart generally comprises a front left wheel driven by a first electric motor via a chain wound around sprocket wheels, a front right wheel driven by a second electric motor via a chain wound around sprocket wheels, left and right rear wheels, and two batteries disposed between the front wheels and the rear wheels. By a user or human operator actuating two switches provided on a handle of the electromotive cart, the first and second electric motors can be controlled independently of each other to thereby allow the cart body to make turns as desired by the operator. The electromotive cart is very advantageous in that it does not produce exhaust gas. However, because the left and right front wheels are independently driven by the first and second motors, its capability to make turns or directional changes renders its linear movement very difficult, so that either a dedicated control device or the operator's experienced handling is required to control the left and right wheels to rotate at a same rate for the smooth linear movement of the cart.

In view of the foregoing, an improved four-wheeled electromotive cart is proposed in Japanese Patent Publication No. 53-4294, which is designed to reliably provide linear movability even on an agricultural road or on narrow, unlevel ground between furrows in a field. In this agricultural electromotive cart, the front wheels are driven by a single electric motor via belts, pulleys, chains and sprocket wheels, and the rear wheel axle has opposite ends bent at appropriate angles to provide toe-in and camber angles of the rear wheels so that linear movement of the cart is ensured on unlevel ground.

However, in the above-mentioned conventional four-wheeled electromotive carts employing belts, chains and sprocket wheels for transmission of the motor force, considerable jolts or shocks and difference in start timing between the left and right front wheels is caused by start of the motor rotation, due to a sudden stretch of the chains and a slip of the belts. In addition, due to the fact that the "front-wheel tread" is the same as the "rear-wheel tread", circling or turning movements of these carts tend to be of relatively large radius and require relatively great operating force by the human operator. Thus, with the arrangements of these conventional electromotive carts, it is difficult for the human operator to manually make small turns or directional changes of the cart.

The electromotive cart disclosed in the No. 51-31502 utility model publication has another drawback in that outer surface portions of the two batteries projecting beyond the outer side surfaces of the front wheels could damage farm products in the course of agricultural work.

Generally, the movement of the electromotive carts is subject to various limitations in carrying out agricultural work in a large-scale vinyl plastic hothouse, and hence it may be said that a lighter weight cart body is more preferred because it permits an easy directional change of the cart through manual operation of the human operator. However, with the electromotive cart disclosed in the No. 51-31502 utility model publication, which is driven via the two electric motors and designed to make directional changes by changing the respective directions of the left and right front wheels, desired directional changes of the body are difficult to make manually due to too heavy overall weight of the cart.

The No. 51-31502 utility model publication and No. 53-4294 patent publication show nothing about a harness unit electrically connecting the batteries and the electric motors, switches, etc. However, generally, if such a harness unit is attached to the body framework, the distance between the harness unit and the ground is small, so that splashed muddy water from the ground adheres to the harness or flicked pebbles from the ground would seriously damage the harness.

SUMMARY OF THE INVENTION

According to a first aspect of the present invention, there is provided an electromotive cart which comprises: a body framework; a pair of left and right front wheels supported by a front portion of the body framework; a pair of left and right rear wheels supported by a rear portion of the body framework; a load carrier base supported by an upper portion of the body framework; a grip handle extending from a rear portion of the load carrier base obliquely upward in a rearward direction of the electromotive cart; a pair of batteries disposed below the load carrier base between the front wheels and the rear wheels in such a manner that the batteries are located along both sides of the body framework; a single electric motor driven by the batteries; and a direct axle driving mechanism, directly coupled with a front-wheel axle, for directly conveying driving force from the electric motor to the left and right front wheels via the front-wheel axle.

In a preferred implementation, the driving mechanism includes a relay shaft connected to an output shaft of the electric motor, a small-diameter bevel gear mounted on a lower end of the relay shaft, and a large-diameter bevel gear engaging with the small-diameter bevel gear. The driving mechanism drives the front-wheel axle that is spline-connected to the large-diameter bevel gear.

Because the electromotive cart drives the left and right front wheels by means of the single electric motor, no rotation speed difference would occur between the left and right front wheels, so that a smooth linear movement of the electromotive cart is permitted. Further, because the left and right front wheels are driven by the motor via the direct axle driving mechanism, the electromotive cart is allowed to smoothly start moving without sudden jolts or shocks caused by start of the motor rotation. To make a direction change of the electromotive cart, it is only necessary for a human operator to lift the obliquely-extending grip handle until the rear wheels are raised off the ground and to turn the cart only about the front wheels. Thus, any desired direction change of the electromotive cart can be made with ease.

The electric motor is preferably mounted in such a manner that the motor axis aligns with a substantially vertical imaginary line extending centrally through the front-wheel axle, a motor case containing the electric motor is located above the front-wheel axle and the output shaft of the electric motor directly connects with the front-wheel axle. Because the electric motor is disposed immediately above the front-wheel axle, the weight of the motor is supported by the front wheels. Since a greater portion of the overall weight of the electromotive cart is supported by the front wheels, a desired directional change can be made easily by turning the cart only about the front wheels. Besides, a sufficiently great approach angle can be provided.

In another preferred implementation, the electric motor is mounted in such a manner that the motor axis aligns with an imaginary slanted line extending upward in a forward direction of the electromotive cart centrally through the front-wheel axle, the motor case containing the electric motor is located forward of the front-wheel axle and the output shaft of the electric motor directly connects with the front-wheel axle. Because the electric motor is disposed with the motor axis extending obliquely upward above the front-wheel axle, it can be located inwardly of an imaginary plane between the outer circumference of the front wheels and the front end of the load carrier base, so that a sufficiently great approach angle can be provided.

In another preferred implementation, the electric motor is mounted in such a manner that the motor axis aligns with a substantially horizontal imaginary line extending centrally through the front-wheel axle, the motor case containing the electric motor is located forward of the front-wheel axle and the output shaft of the electric motor directly connects with the front-wheel axle. Because the rather-heavy electric motor is located forwardly of the front-wheel axle, a greater portion of the overall weight of the electromotive cart is supported by the front wheels—i.e, the center of gravity of the cart can be placed off the center of the carrier base toward the front wheels. Thus, a great downward force is applied to the driven front wheels so that the "grip" of the front wheels can be enhanced, which achieves improved running performance.

In still another preferred implementation, the electric motor is mounted in such a manner that the motor axis aligns with an imaginary line lying parallel to and offset by a predetermined distance upward from a substantially horizontal imaginary line that extends centrally through the front-wheel axle, the motor case containing the electric motor is located forward of the front-wheel axle and the output shaft of the electric motor directly connects with the front-wheel axle. Because the rather-heavy electric motor is located forwardly of the front-wheel axle, a greater portion of the overall weight of the electromotive cart is supported by the front wheels—i.e, the center of gravity of the cart can be placed off the center of the carrier base toward the front wheels. Thus, the grip of the front wheels can be enhanced for improved running performance. Further, because the electric motor is located at a relatively great distance of the ground, a greater approach angle is provided.

In the electromotive cart of the present invention, the left and right rear wheels are each smaller in diameter than the left and right front wheels, a distance between outer side surfaces of the left and right front wheels is greater than a distance between outer side surfaces of the left and right rear wheels, and the left and right batteries are positioned so as not to project laterally beyond the outer side surfaces of the left and right front wheels. Because the distance between the outer side surfaces of the left and right front wheels is greater that of the left and right rear wheels, the cart can be turned, with a small turning radius, about the rear wheels while the front wheels are raised off the ground, so that it can be readily changed in direction by the human operator. Further, because the batteries are positioned so as not to project laterally beyond the outer side surfaces of the left and right front wheels, farm products or the like would not be damaged by the outer side surfaces of the batteries.

In still another preferred implementation, the electric motor is mounted in such a manner that the motor axis aligns with a substantially vertical imaginary line extending centrally through the front-wheel axle, a motor case containing the electric motor is located above the front-wheel axle and the output shaft of the electric motor directly connects with the front-wheel axle, and wherein the load carrier base is directly connected with the motor case. Because the motor case also functions as part of the body framework, it is possible to effectively reduce the number of necessary component parts for supporting the load carrier base, to thereby make the framework lighter in weight and much simpler in construction. Because the rather-heavy electric motor is located immediately above the front-wheel axle, a greater portion of the overall weight of the electromotive cart is supported by the front wheels—i.e, the center of gravity of the cart can be placed off the center of the carrier base toward the front wheels. To make a direction change of the electromotive cart, it is only necessary for the human operator to depress the obliquely-extending grip handle until the front wheels are raised off the ground and to turn the cart only about the rear wheels. Thus, any desired direction change of the electromotive cart can be made with ease.

According to a second aspect of the present invention, there is provided an electromotive cart which comprises: a body framework supporting a pair of left and right front wheels, a pair of left and right rear wheels and an electric motor for driving the left and right front wheels; a load carrier base supported by an upper portion of the body framework with a predetermined space left therebetween, the electric motor being attached to a rear portion of the load carrier base; a control panel for controlling the electric motor; a pair of batteries disposed below the load carrier base in such a manner that the batteries are located along both sides of the body framework; trunk harness attached to and extending along an underside of the load carrier base; a plurality of branch harness members branching out from the trunk harness for electrical connection with the batteries, electric motor and other electric elements of the electromotive cart via cable couplers.

Because the trunk harness is attached to the load carrier base disposed over the body framework, it is at a sufficiently great distance from the ground and can be effectively protected from muddy water or pebbles splashed or flicked from the ground. In one preferred implementation, the trunk harness is positioned immediately above a main frame of the body framework, so that it is protected by the main frame from flicked pebbles or the like. Through a sufficiently great space formed between the body framework and the load carrier base, the user or human operator can visually check the trunk harness. Further, because the branch harness members branching out from the trunk harness are connected with the batteries and other electric elements, mounting of the harness is greatly facilitated.

BRIEF DESCRIPTION OF THE DRAWINGS

Preferred embodiments of the present invention will be described hereinbelow, by way of example only, with reference to the accompanying drawings, in which:

FIG. 8 is a schematic side view of an electromotive cart according to a second embodiment of the present invention;

FIG. 11 is a schematic plain view of an electromotive cart according to a fifth embodiment of the present invention;

FIGS. 12A and 12B are views explanatory of exemplary operation of the electromotive cart of FIG. 11, of which FIG. 12A shows a manner in which the electromotive cart changes direction by turning about front wheels and FIG. 12B shows a manner in which the electromotive cart changes direction by turning about rear wheels;

FIG. 15 is a perspective view showing a load carrier base and rails placed in an upside-down state.

DETAILED DESCRIPTION OF THE PREFERRED EMBODIMENTS

The following description is merely exemplary in nature and is in no way intended to limit the invention or its application or uses.

Figure 1:
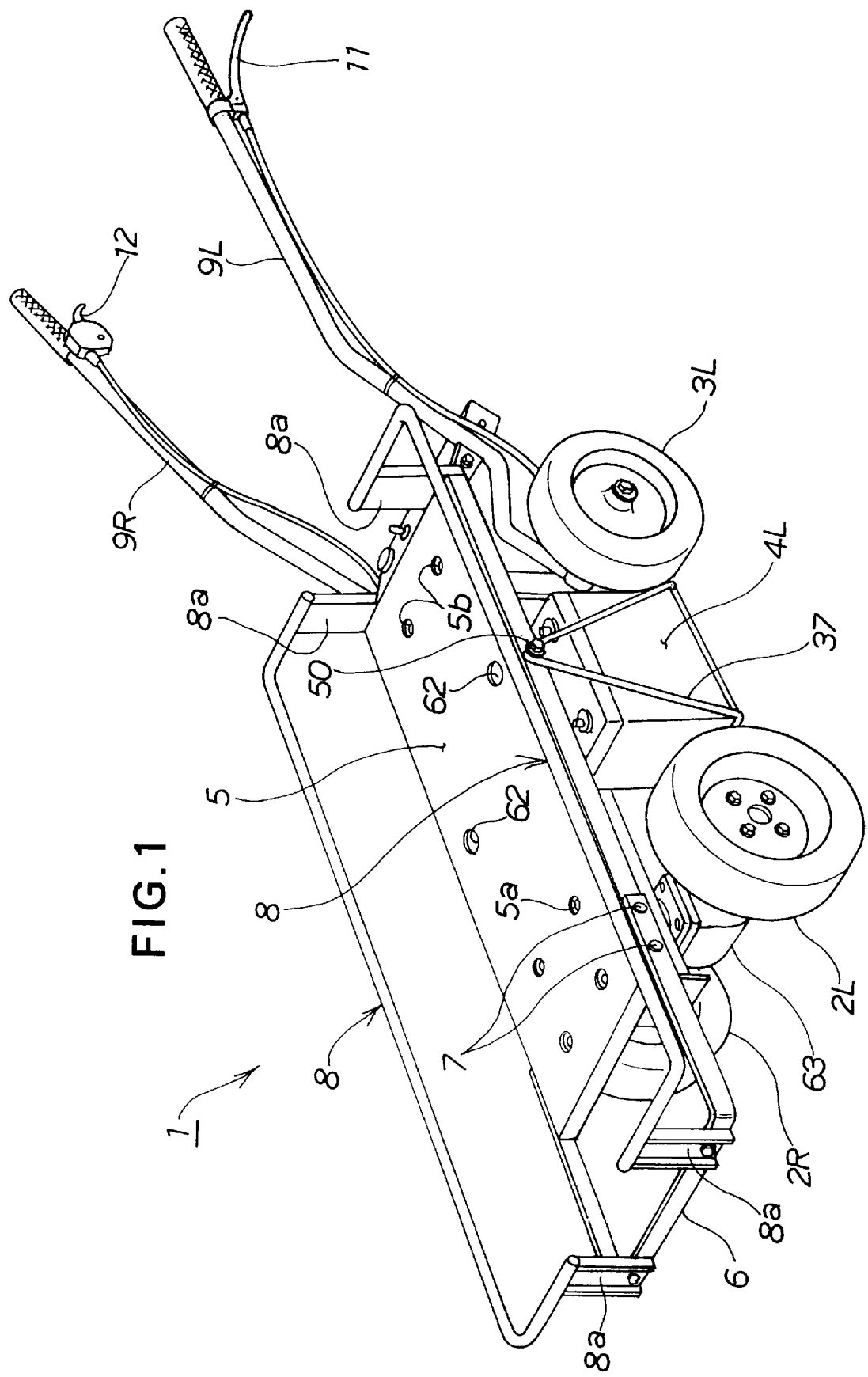
FIG. 1 is a schematic perspective view of an electromotive cart according to a first embodiment of the present invention.
Figure 4:
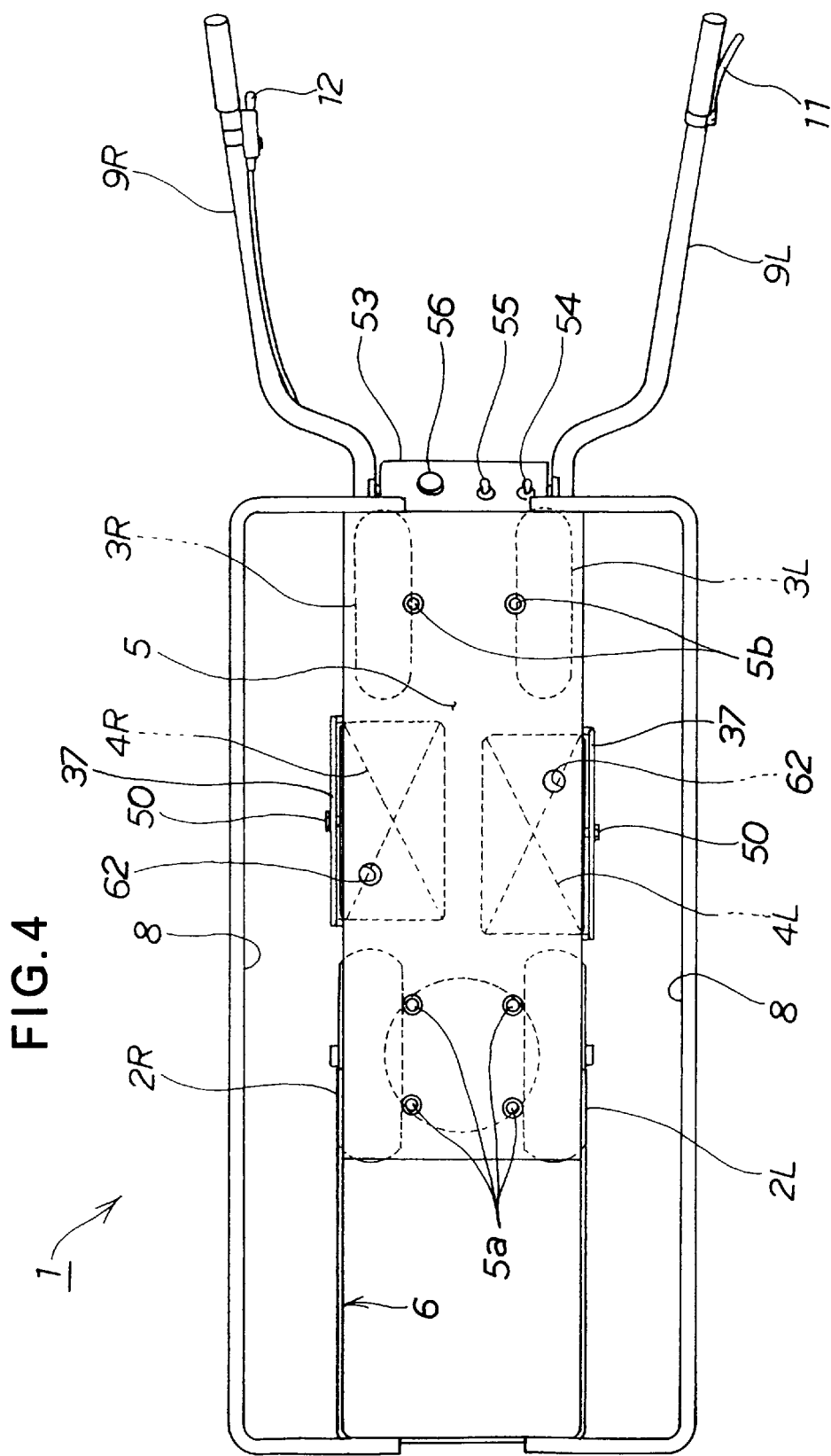
FIG. 4 is a schematic plan view of the electromotive cart shown in FIG. 1.

FIG. 1 is a schematic perspective view of an electromotive cart according to a first embodiment of the present invention. This electromotive cart 1 is a four-wheeled automotive light vehicle including a pair of left and right front wheels 2L, 2R and a pair of left and right rear wheels 3L, 3R (the right rear wheel 3R is shown in FIG. 4), and left and right batteries 4L and 4R (the right battery 4R is shown in FIG. 4) are disposed between the front wheels 2L, 2R and the rear wheels 3L, 3R.

Frame 6 is secured to a front portion of a U-shaped load carrier base 5 by means of bolts 7. A pair of left and right rails 8 are mounted on the load carrier base 5 in opposed relation to each other via vertical support members 8a and extend between a front end of the frame 6 and a rear end of the base 5.

Left and right grip handles 9L and 9R are pivotably attached to an axle of the left and right rear wheels 3L and 3R and extend therefrom obliquely upward in the rearward direction of the cart 1. The left handle 9L is provided with a brake lever 11, while the right handle 9R is provided with a gear shifting lever 12.

Figure 2:
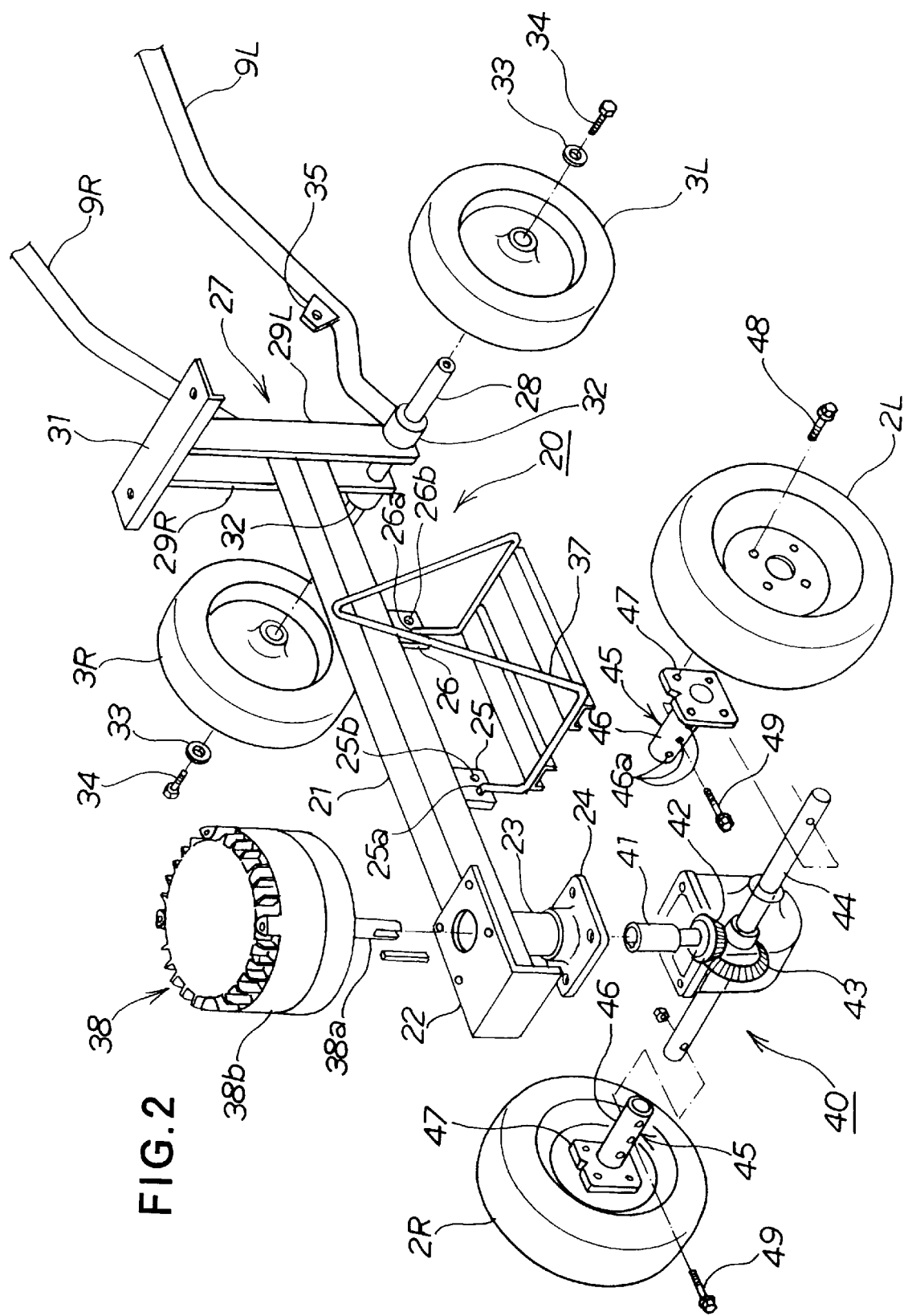
FIG. 2 is an exploded perspective view showing a lower-half structure of the electromotive cart shown in FIG. 1.

FIG. 2 is an exploded perspective view showing a lower-half structure of the electromotive cart shown in FIG. 1. Body framework 20 includes a main frame 21 extending in the front-rear direction of the cart 1, which includes a motor mounting base 22 provided on the front upper surface thereof for mounting thereon an electric motor 38, an outer cylinder 23 provided on the front lower surface thereof, and a gearcase mounting base 24 attached to a bottom portion of the cylinder 23 for mounting thereon a gearcase 63 (see FIG.5). Centrally on the underside of the main frame 21, there are provided a pair of battery supporting members 25 and 26 in spaced-apart relation to each other. Further, a generally T-shaped rear frame 27 is provided on a rear portion of the main frame 21, and it includes a pair of left and right vertical frame members 29L and 29R carrying a rear-wheel axle 28 at the lower ends thereof and a cross frame member 31 for directly supporting thereon the load carrier base 5.

The rear-wheel axle 28 is a non-rotatable shaft, on which the rear wheels 3L and 3R are rotatably mounted by means of washers 33 and bolts 34 after lower-end base portions 32 of the grip handles 9L and 9R are threaded over the axle 28. Thus, the grip handles 9L and 9R are vertically tiltable about the rear wheel axle 28 to function as so-called "tilt handles" whose intermediate connector pieces 35 (one of the connector pieces is invisible in FIG. 2) are bolted to the load carrier base 5 (FIG. 1).

Each of the battery supporting members 25 and 26 has a pair of front and rear apertures 25a, 25b and 26a, 26b. Left battery cage 37 for supporting the left battery 4L (FIG. 4) has opposite ends inserted in the front apertures 25a and 26a in such a manner that the cage 37 is tiltable about the front apertures 25a and 26a. Similarly, right battery cage 37 for supporting the left battery 4R (FIG. 4) has opposite ends inserted in the rear apertures 25b and 26b in such a manner that the cage 37 is tiltable about the rear apertures 25b and 26b.

Now, a description will be made of a driving mechanism for the front wheels. The electromotive cart of the present invention is characterized in that the front wheels 2L and 2R are driven by the electric motor 38 via a direct axle driving mechanism 40 directly connected to the front-wheel axle as will be described hereinbelow. Because no chains and belts are employed, the inventive electromotive cart can convey great torque directly to the front wheels 2L and 2R without starting jolts or shocks and hence can travel smoothly and yet powerfully.

The direct axle driving mechanism 40 includes: a relay shaft 41 in which an output shaft 38a of the motor 38 is inserted to convey driving force from the motor 38 to the front wheels 2L and 2R; a small-diameter bevel gear 42 mounted on the lower end of the relay shaft 41; a large-diameter bevel gear 43 engaging with the small-diameter bevel gear 42; the front-wheel axle 44 spline-connected to the large-diameter bevel gear 43; and metal couplers 45 for coupling the left and right front wheels 2L and 2R to the front-wheel axle 44.

Each of the metal couplers 45 includes a pipe portion 46 in which one end portion of the front-wheel axle 44 is inserted, and a rectangular flange portion 47 to which the front wheel 2L or 2R is secured by means of bolts 48. The pipe portion 46 is fitted over and fixed to the one end portion of the front-wheel axle 44 by means of bolts 49. If a plurality of bolt-inserting holes 46a are formed in the one end portion of the axle 44 as illustrated, the position of the pipe 46 on the axle 44 can be selectably changed to thereby vary the distance between the left and right front wheels 2L and 2R (i.e., the front-wheel tread).

Figure 3:
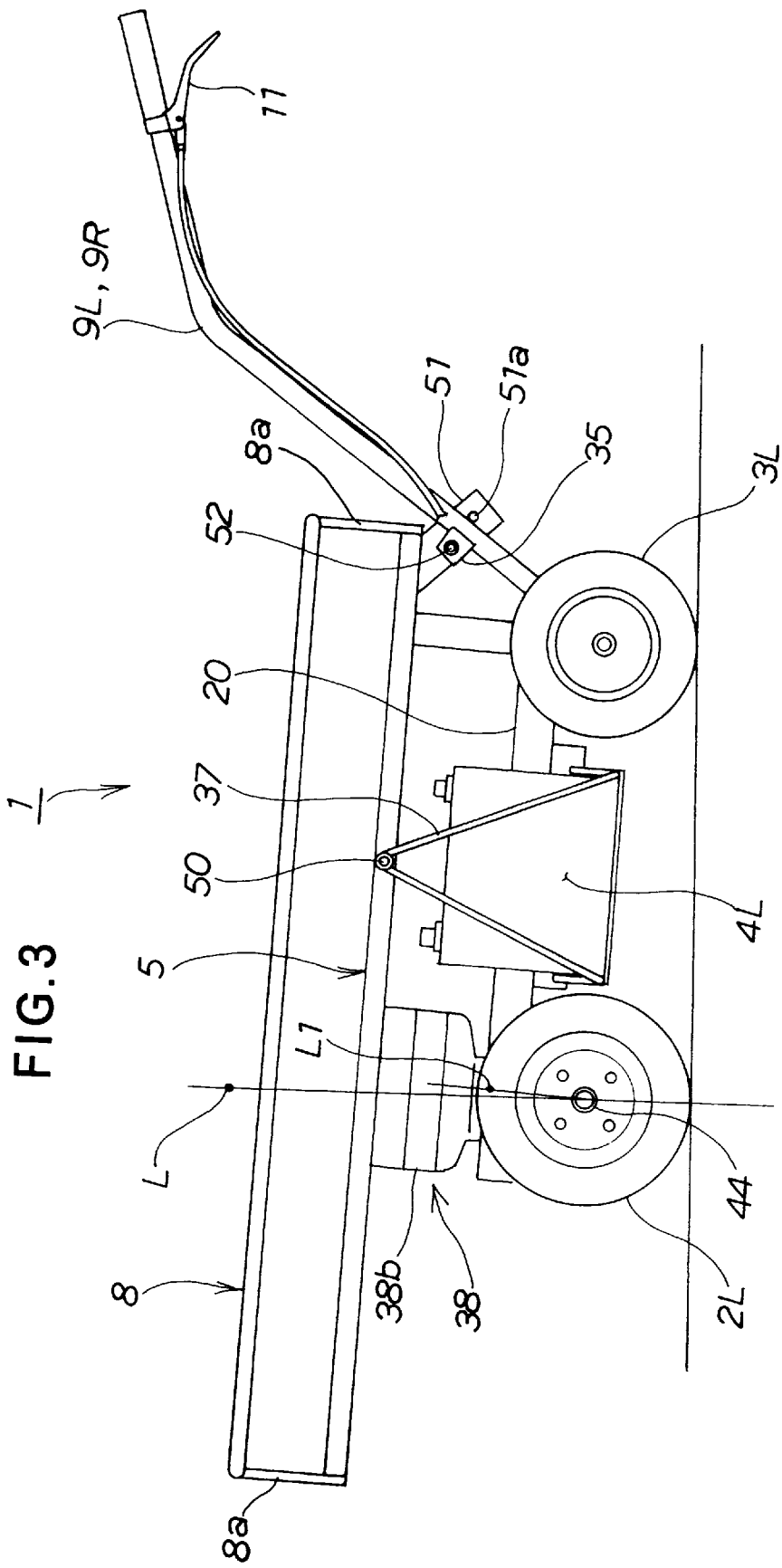
FIG. 3 is a schematic side view of the electromotive cart shown in FIG. 1.

FIG. 3 is a schematic side view of the electromotive cart 1 shown in FIG. 1. As shown, the load carrier base 5 progressively slants upward in the forward direction and is supported directly on a case 38b for the electric motor 38; that is, the motor case 38b also functions as part of the body framework 20. With the load carrier base 5 so slanting, the motor axis L1 slightly deviates from a vertical imaginary line L extending centrally through the front-wheel axle 44. The battery cage 37 is hung, by its chevron-shaped top, on a hanger bolt 50 attached to the load carrier base 5. Each of the grip handles 9L and 9R is fixed to the load carrier base 5 by coupling, by means of a bolt 52, the intermediate connector piece 35 with a handle bracket 51 extending from the carrier base 5. If a plurality of bolt-inserting holes 51a are formed in the handle bracket 51, the mounted angle of the handle 9L, 9R can be adjusted by re-inserting the bolt 52 into a different one of the holes 51a, and thus the height of the grip from the ground can be varied as desired.

FIG. 4 is a schematic plan view of the electromotive cart 1 shown in FIG. 1. As shown, the load carrier base 5 is an elongate flat plate that covers the front wheels 2L and 2R, batteries 4L and 4R and rear wheels 3L and 3R. With the above-mentioned frame 6 and opposed rails 8, the load carrier base 5 provides an increased carrying area which is in a shape suitable for carrying thereon bottomed cases and boxes. Because the area of the load carrier base 5 itself is very small relative to the total available load-carrying area, the load carrier base 5 has a substantially reduced weight. However, the relative positional arrangement among the load carrier base 5, frame 6 and rails 8 may be selected depending on the application, since the size of the load carrier base 5 can be safely increased up to the area surrounded by the rails 8.

Control panel 53 is provided, immediately rearward of the load carrier base 5, for operation by the user or human operator to control the electric motor 38. This control panel 53 includes a main switch 54, a forward/rearward-travel shifting switch 55, and a residual battery-power meter 56. Reference numeral 5a denotes bolts for coupling the load carrier base 5 with the motor case 38b. Reference numeral 5b denotes bolts for coupling the load carrier base 5 with the cross frame 31 shown in FIG. 2. Numeral 62 denotes holes through which the batteries 4L and 4R are visually observable. Specifically, each of the batteries 4L and 4R has a residual battery-power indicating function that causes the color of the battery to change depending on the current residual battery power, and the holes 62 allow the human operator to inspect the respective colors of the batteries 4L and 4R at any time.

Figure 5:
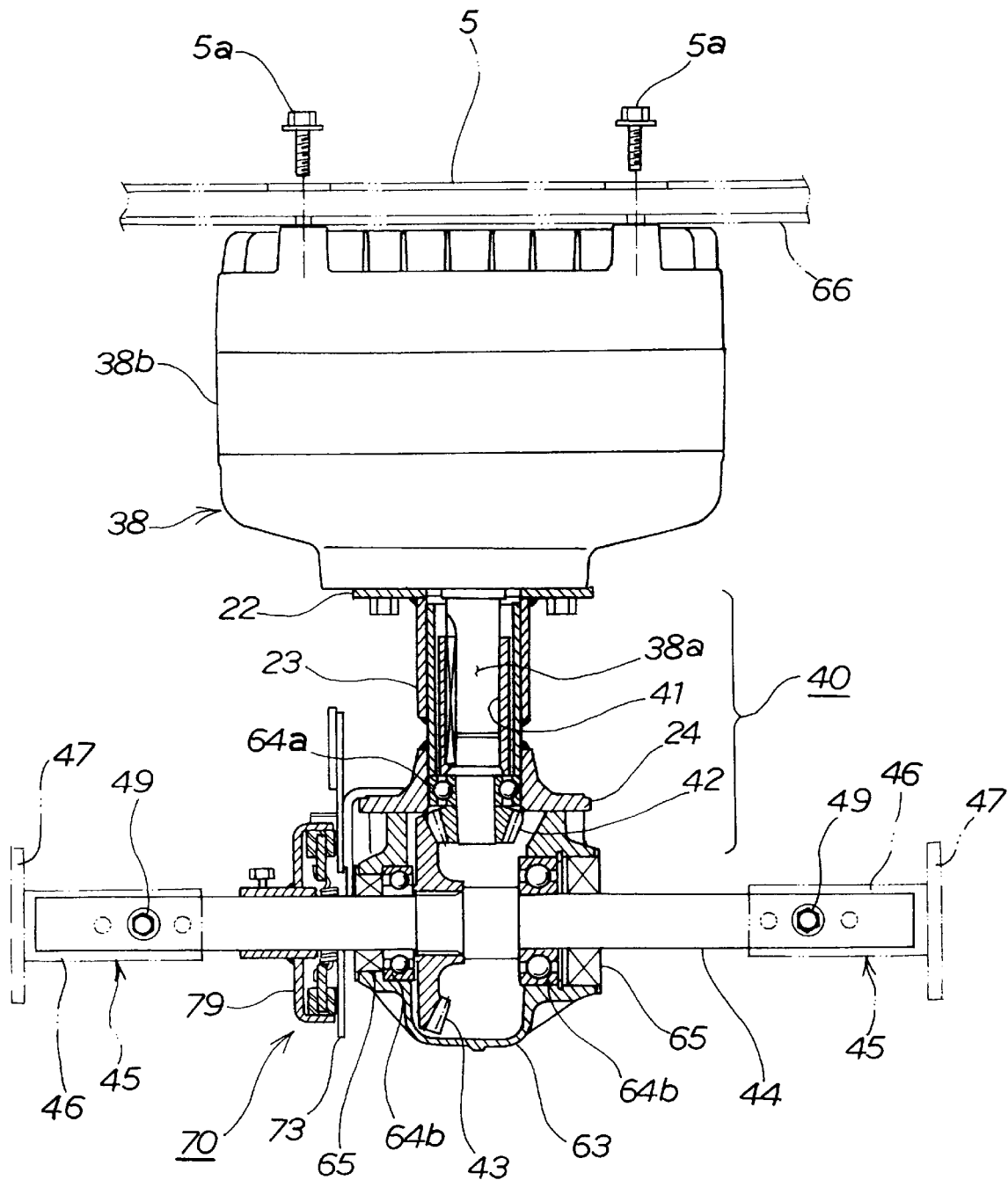
FIG. 5 is a sectional view showing details of a direct axle driving mechanism of FIG. 2.

The following paragraphs describe in greater detail the direct axle driving mechanism 40 with particular reference to FIG. 5. As noted briefly earlier, the direct axle driving mechanism 40 includes the pipe-shaped relay shaft 41 connected to the output shaft 38a of the electric motor 38, and the small-diameter bevel gear 42 mounted on the lower end of the relay shaft 41. The large-diameter bevel gear 43 engaging with the small-diameter bevel gear 42 is spline-connected to the front-wheel axle 44. The rotating speed of the electric motor 38 can be reduced via the small-diameter and large-diameter bevel gears 42 and 43.

The electric motor 38 imparts a same-speed rotating force to the left and right front wheels 2L and 2R (see FIG. 2) by way of the relay shaft 41, small-diameter bevel gear 42, large-diameter bevel gear 43, front-wheel axle 44 and metal couplers 45, so that the electromotive cart 1 will have sufficient linear movability. The electric motor 38 is attached on the top of the motor mounting base 22, and the gearcase 63 receiving therein the large-diameter bevel gear 43 is attached to the gearcase mounting base 24. Reference numeral 64a denotes a ball bearing for the relay shaft 41, 64b denotes ball bearings for the front-wheel axle 44, and 65 denotes oilseals.

The load carrier base 5, represented in imaginary line in FIG. 5, is secured to the motor case 38b by means of the bolts 5a, and the motor case 38b also functions as part of the body framework 20 (FIG. 3), as noted earlier. As a result, it is possible to effectively reduce the number of necessary component parts for supporting the load carrier base 5 on the body framework 20, to thereby make the framework 20 lighter in weight and simpler in construction.

As further shown in FIG. 5, the load carrier base 5 has the underside with a channel-shaped attachment 66 and the bolts 5a are inserted through the attachment 66 so that the heads of the bolts 5a are located below the upper surface of the load carrier base 5 rather than projecting above the upper surface. Reference numeral 70 denotes a brake mechanism disposed to the left of the gearcase 63.

Figure 6:
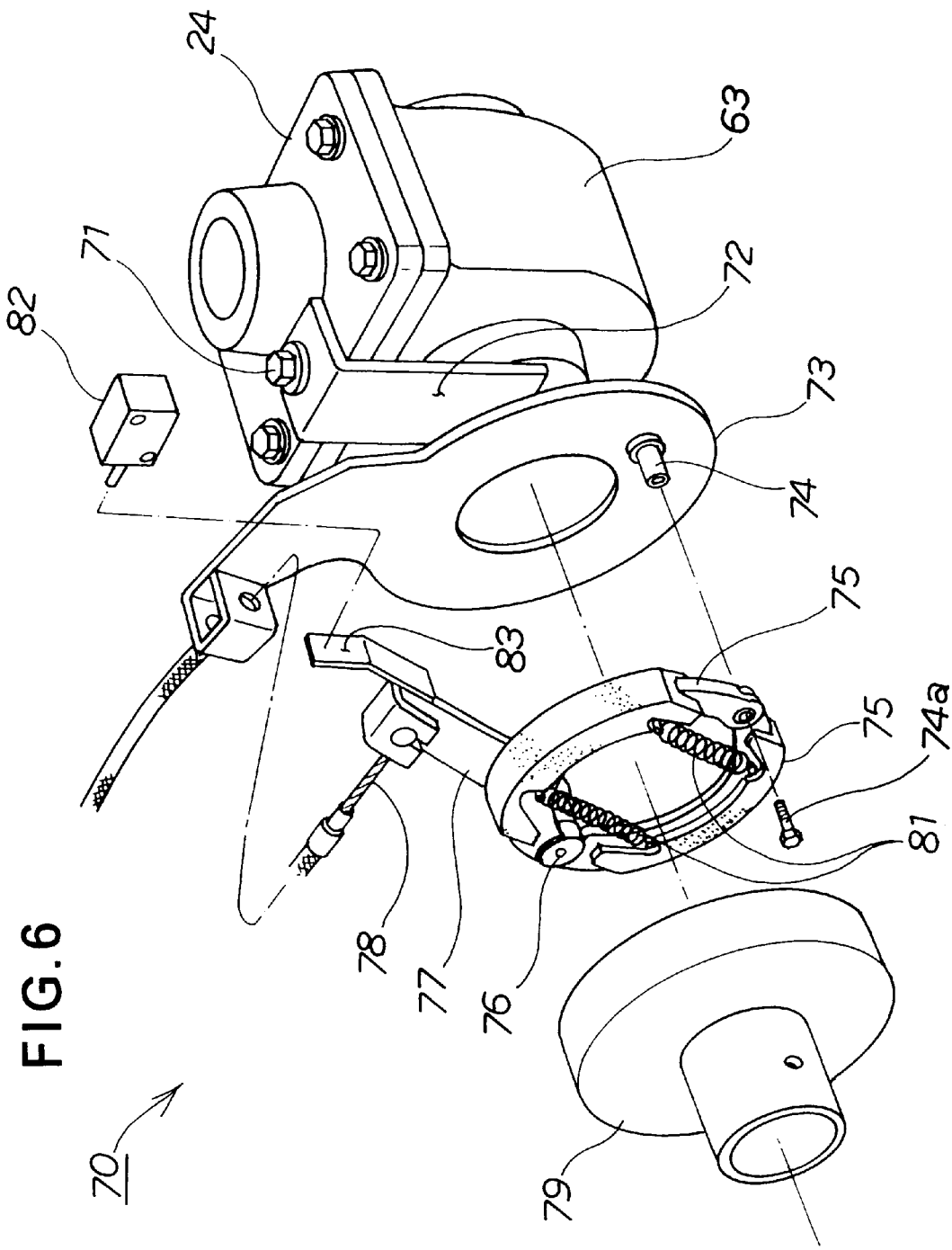
FIG. 6 is an exploded view of a brake mechanism of FIG. 5.

FIG. 6 is an exploded view of the brake mechanism 70, which is in the form of a drum brake. Metal coupler 72 for fixing a bracket 73 is attached to the upper surface of the gearcase mounting base 24 by means of a bolt 71. Brake shoes 75 with brake pads are fixed to the bracket 73 by means of a bolt 74a inserted therethrough into a bush 74. The brake shoes 75 are forced apart by a cam 76 into contact with the inner surface of a rotating brake drum 79, to thereby generate braking force. The cam 76 is rotated via a cam lever 77 by pulling a brake wire 78. Reference 81 denotes springs which normally bias the brake shoes 75 toward each other, 82 denotes a brake switch, and 83 denotes a striker.

The brake drum 79 is mounted on the front-wheel axle 44, and the brake shoes 75 and bracket 73 are supported by the cart body. This way, the electromotive cart 1 can be braked by thrusting the stationary brake shoes 75 against the rotating brake drum 79.

Figure 7A:
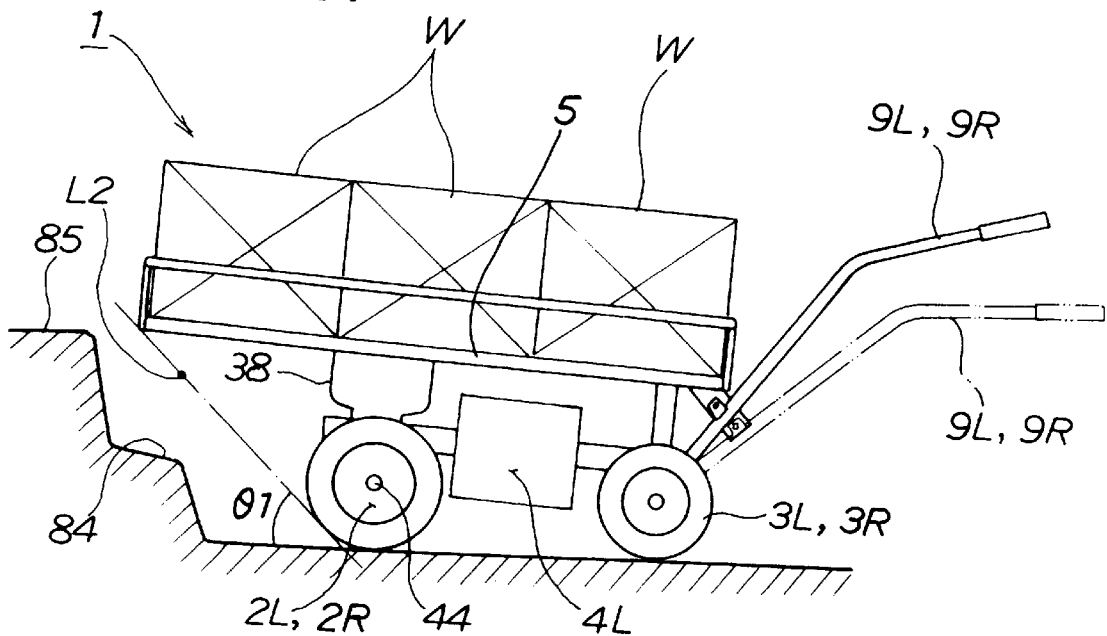
FIGS. 7A and 7B are views explanatory of exemplary operation of the electromotive cart according to the first embodiment.

Now, a description will be made about exemplary operation of the electromotive cart 1 according to the first embodiment, with reference to FIGS. 7A and 7B. FIG. 7A shows the electromotive cart 1 travelling forward with three pieces of load W loaded thereon. The grip handles 9L and 9R are movable from the solid-line position to the imaginary-line position and vice versa as desired by the human operator.

Angle between a tangential line L2 of the front wheels 2L, 2R passing the front end of the load carrier base 5 and the ground surface forms an approach angle θ1, which is a kind of numerical value indicating, for example, to what extent the electromotive cart 1 can approach lower and upper stepped portions 84 and 85. The approach angle θ1 closer to 90° indicates that the electromotive cart 1 can come closer to the stepped portions 84 and 85. Greater approach angle θ1 would generally mean that the front end of the load carrier base 5 is located rearward of the front end of the wheels 2L, 2R and hence that the load carrier base 5 has a smaller area. However, according to the present invention, a sufficiently great approach angle can be provided without a need to reduce the area of the load carrier base 5, because the electric motor 38 is disposed above the front wheel axle 44.

Figure 7B:
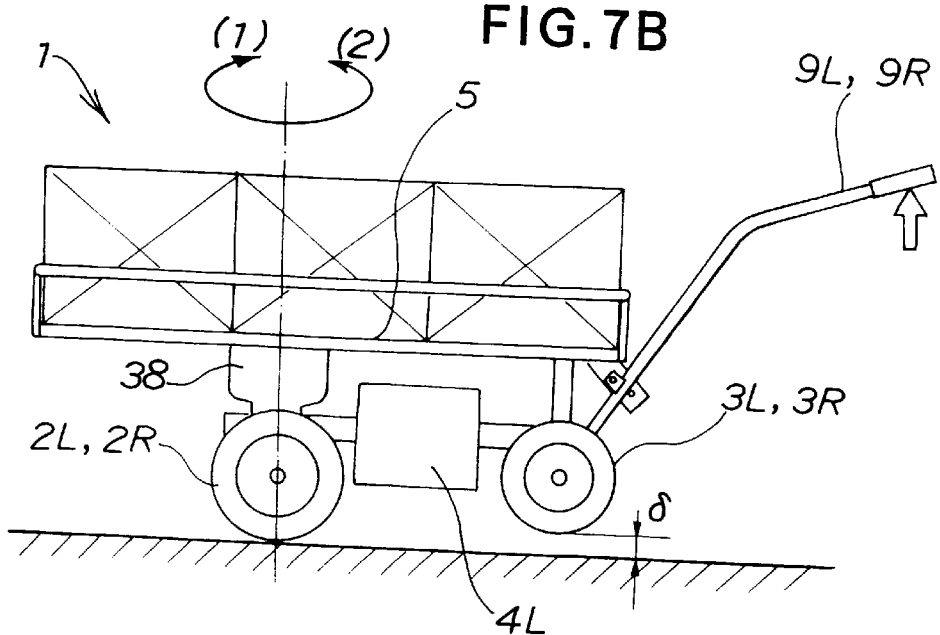

As shown in FIG. 7B, the direction of the cart 1 can be changed by only lifting the grip handles 9L and 9R until the rear wheels 3L and 3R are raised to a predetermined distance δ from the ground and then turning the cart 1 only about the front wheels 2L and 2R in the direction of arrow (1) or (2). Because the grip handles 9L and 9R extend obliquely upward in the rearward direction of the cart 1, the human operator can apply upward force and horizontal (i.e., perpendicular to the plane of the sheet of the drawing) force to the rear portion of the load carrier base 5. Thus, with the grip handles 9L and 9R extending obliquely upward in the rearward direction, the electromotive cart 1 can be turned for its directional changes with utmost ease.

FIG. 8 is a schematic side view of an electromotive cart according to a second embodiment of the present invention. In this electromotive cart 1a, the left and right front wheels 2L and 2R are disposed on a front portion of a U-shaped body framework 20a, the batteries 4L and 4R are disposed on a central portion of the framework 20a, and the load carrier base 5 is disposed over the framework 20a. The grip handles 9L and 9R slanting upward from the load carrier base 5 in the rearward direction of the cart 1a, and the electric motor 38 is located diagonally to the upper front (left in FIG. 8) of the front-wheel axle 44, preferably at an angle between 30° and 50° relative to the horizontal plane.

Namely, according to the second embodiment of the present invention, the electric motor 38 is mounted in such a manner that the motor axis L1 aligns with a slanted imaginary line L3 extending, centrally through the front-wheel axle 44, upward toward the front of the load carrier base 5 (in the forward direction of the cart), the motor case 38b is located forward of the axle 44 and the output shaft of the motor 38 directly connects with the axle 44. The second embodiment provides a sufficiently great approach angle θ2 as shown.

Let us assume here that the load carrier base 5 has the center of gravity G0 near its longitudinal center. Because the center of gravity G1 of the motor 38 is located forward of the front-wheel axle 44, the center of gravity G2 of the entire electromotive cart 1a will be located off the center of gravity G0 toward the front-wheel axle 44. Owing to the center of gravity G2 of the entire electromotive cart 1a being located off the center of gravity G0 toward the front-wheel axle 44, the cart 1a can be turned by the human operator, in the manner shown in FIG. 7B, with very small force. Thus, the electromotive cart 1a can be turned or changed in direction with utmost ease while providing a sufficiently great approach angle.

Figure 9:
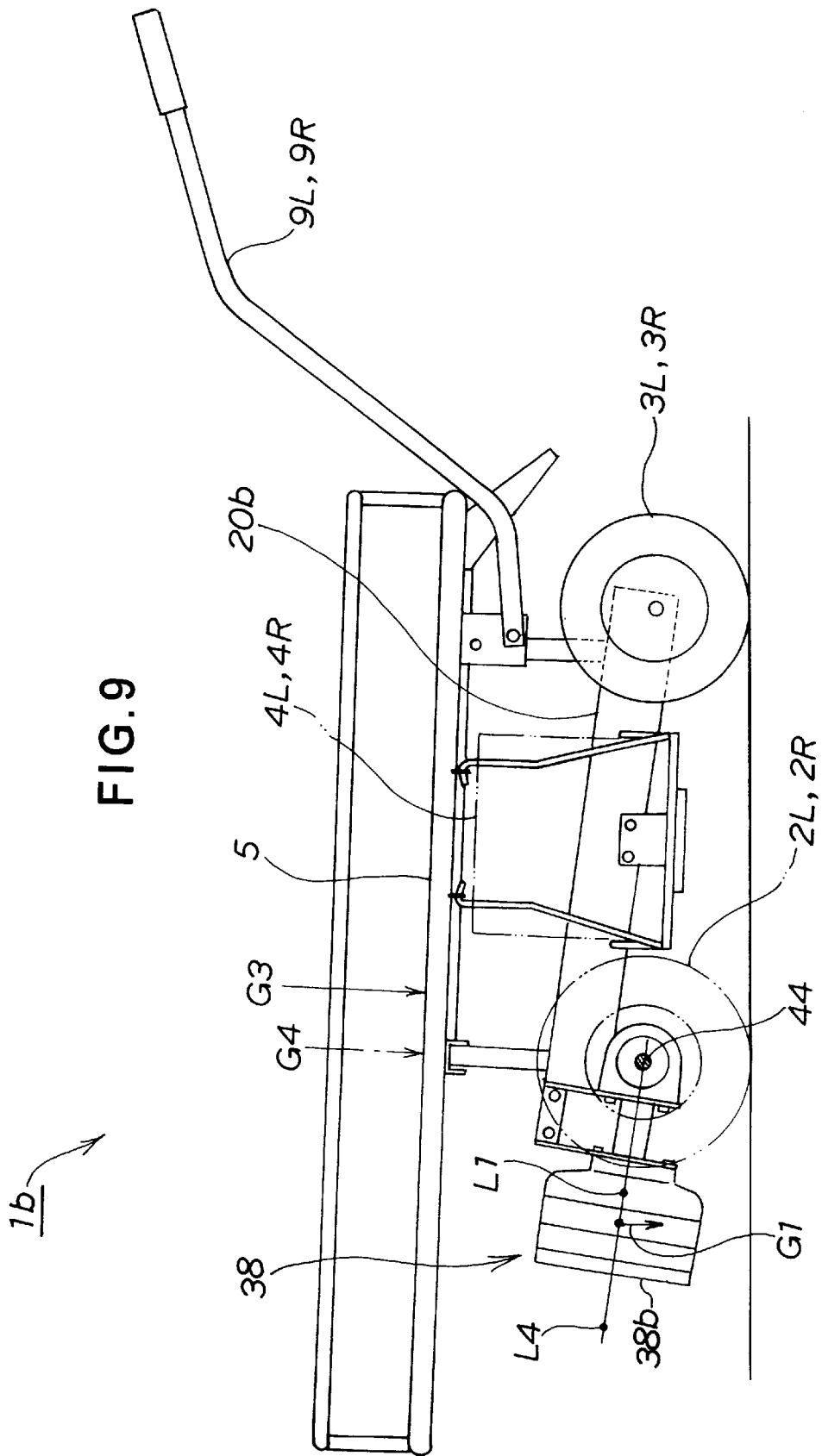
FIG. 9 is a schematic side view of an electromotive cart according to a third embodiment of the present invention.

FIG. 9 is a schematic side view of an electromotive cart according to a third embodiment of the present invention. In this electromotive cart 1b, the left and right front wheels 2L and 2R are disposed on a body framework 20b slanting upward toward the front of the cart 1b, the batteries 4L and 4R are disposed on a central portion of the framework 20b, and the load carrier base 5 is disposed over the framework 20a. The grip handles 9L and 9R slant upward from the load carrier base 5 in the rearward direction of the cart 1b, and the electric motor 38 is located forward of the front-wheel axle 44.

Namely, according to the third embodiment of the present invention, the electric motor 38 is mounted in such a manner that the motor axis L1 aligns with a substantially horizontal imaginary line L4 extending centrally through the front-wheel axle 44 and slightly slanting at an angle between 0° and 20° relative to the horizontal plane, the motor case 38b is located forward of the axle 44 and the output shaft of the motor 38 directly connects with the axle 44.

Let us assume here that the load carrier base 5 has the center of gravity G3 near its longitudinal center. Because the center of gravity G1 of the motor 38 is located far forward of the front-wheel axle 44, the center of gravity G4 of the entire electromotive cart 1b will be located off the center of gravity G3 toward the front-wheel axle 44. Owing to the center of gravity G4 of the entire electromotive cart 1b located very close to the front-wheel axle 44, the cart 1b can be turned by the human operator with even smaller force. Thus, the electromotive cart 1b according to the third embodiment can also be turned or changed in direction with utmost ease.

Figure 10:
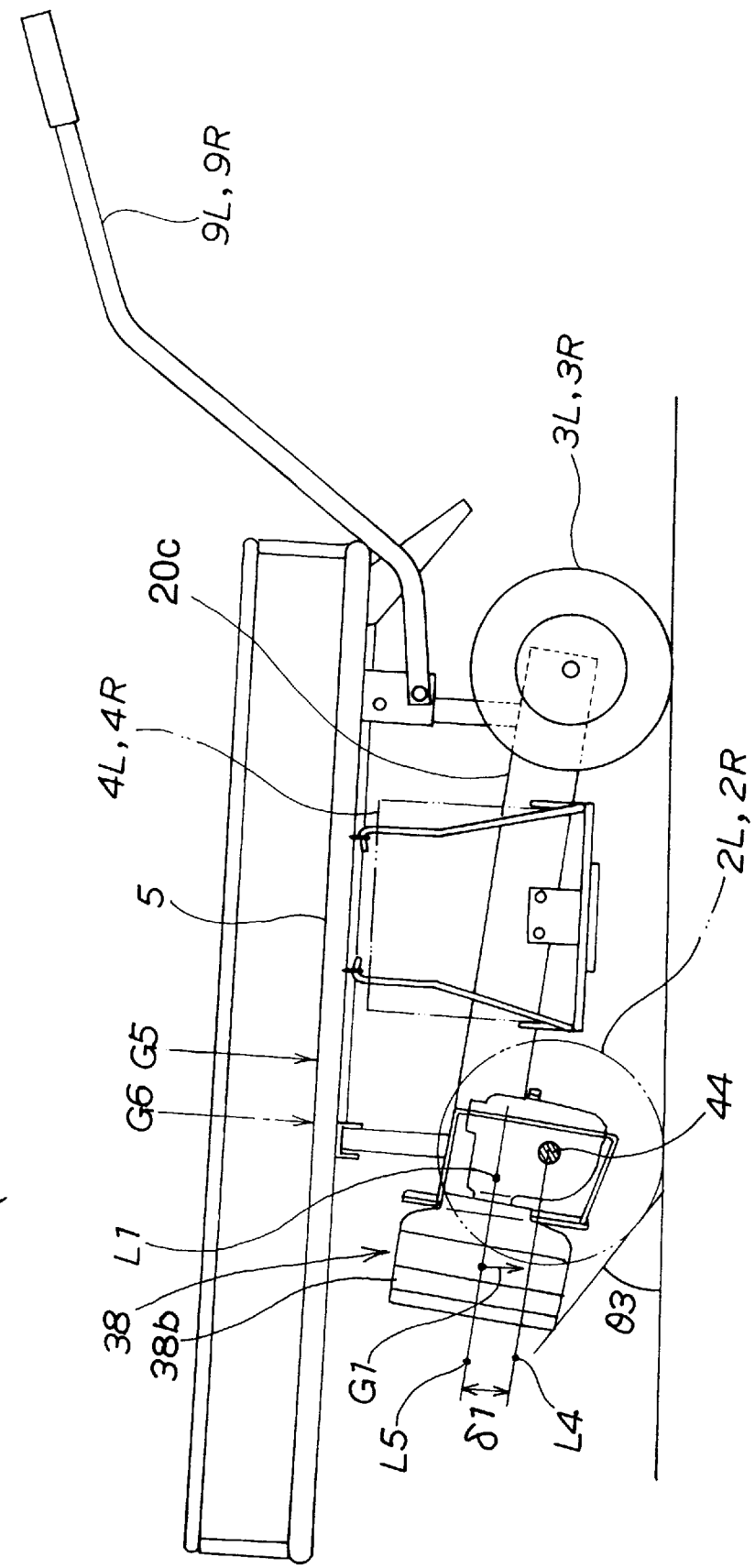
FIG. 10 is a schematic side view of an electromotive cart according to a fourth embodiment of the present invention.

FIG. 10 is a schematic side view of an electromotive cart according to a fourth embodiment of the present invention. In this electromotive cart 1c, the left and right front wheels 2L and 2R are disposed on a body framework 20c slanting upward toward the front of the cart 1c, the batteries 4L and 4R are disposed on a central portion of the framework 20c, and the load carrier base 5 is disposed over the framework 20c. The grip handles 9L and 9R slant upward from the load carrier base 5 in the rearward direction of the cart 1c, and the electric motor 38 is located forward of the front-wheel axle 44 with the motor axis L1 offset from the front-wheel axle 44.

Namely, according to the fourth embodiment of the present invention, the electric motor 38 is mounted in such a manner that the motor axis L1 aligns with a horizontal imaginary line L5, lying parallel to and offset by a predetermined distance δ1 upward from the line L4 extending centrally through the front-wheel axle 44, the motor case 38b is located forward of the axle 44 and the output shaft of the motor 38 directly connects with the axle 44. Because the electric motor 38 is mounted with the motor axis L1 lying at a predetermined distance δ1 over the line L4, the electromotive cart 1c can provide a sufficiently great approach angle θ3.

Let us assume here that the load carrier base 5 has the center of gravity G5 near its longitudinal center. Because the center of gravity G1 of the motor 38 is located far forward of the front-wheel axle 44, the center of gravity G6 of the entire electromotive cart 1c will be located off the center of gravity G5 toward the front-wheel axle 44. Owing to the center of gravity G6 of the entire electromotive cart 1c located very close to the front-wheel axle 44, the cart 1c can be turned by the human operator with even smaller force. Thus, the electromotive cart 1c according to the fourth embodiment can also be turned or changed in direction with utmost ease while providing a sufficiently great approach angle.

According to the present invention, the electric motor 38 may be mounted in any postures as long as the motor 38 directly connects with the front-wheel axle. Further, the motor case may be positioned off the load carrier base rather than being positioned to directly support thereon the load carrier base.

FIG. 11 is a schematic plan view of an electromotive cart according to a fifth embodiment of the present invention, which is similar to FIG. 1. The electromotive cart 1 according to the fifth embodiment is characterized in that the rear wheels 3L and 3R are smaller in diameter than the front wheels 2L and 2R, the distance between the outer side surfaces of the front wheels is greater than that of the rear wheels, and the left and right batteries 4L and 4R are positioned so as not to project laterally beyond the outer side surfaces of the left and right front wheels 2L and 2R (preferably, the distance between the outer side surfaces of the front wheels is greater than a maximum width of a region where the batteries 4L and 4R are disposed in opposed relation). Thus, it is possible to avoid the possibility that farm products are damaged by the outer side surfaces of the batteries 4L and 4R during operation of the electromotive cart.

Figure 12A:
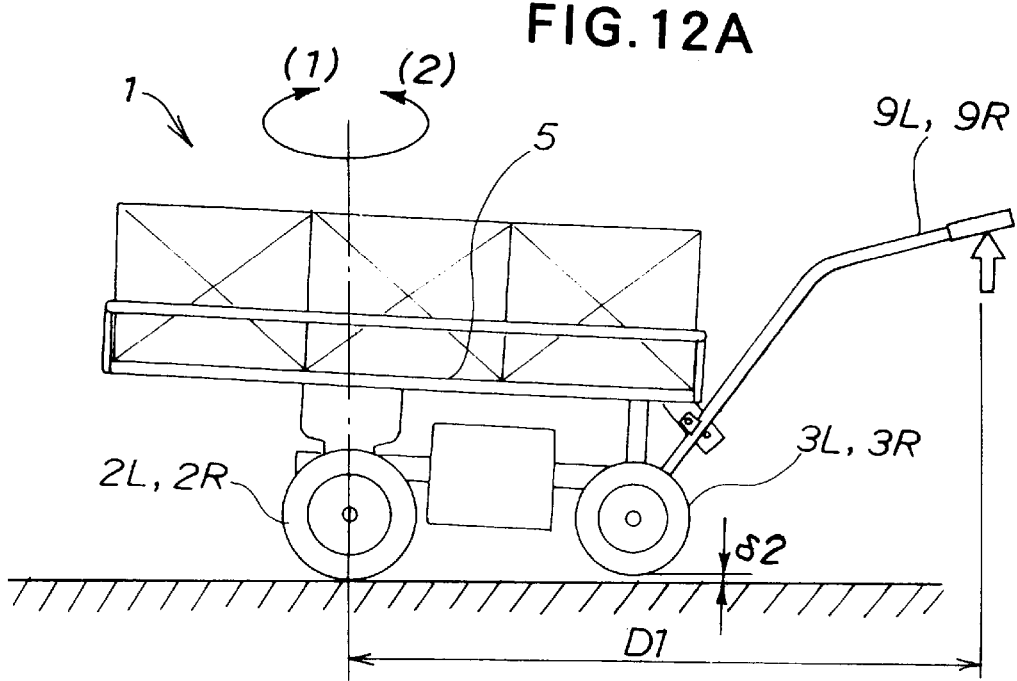
Figure 12B:
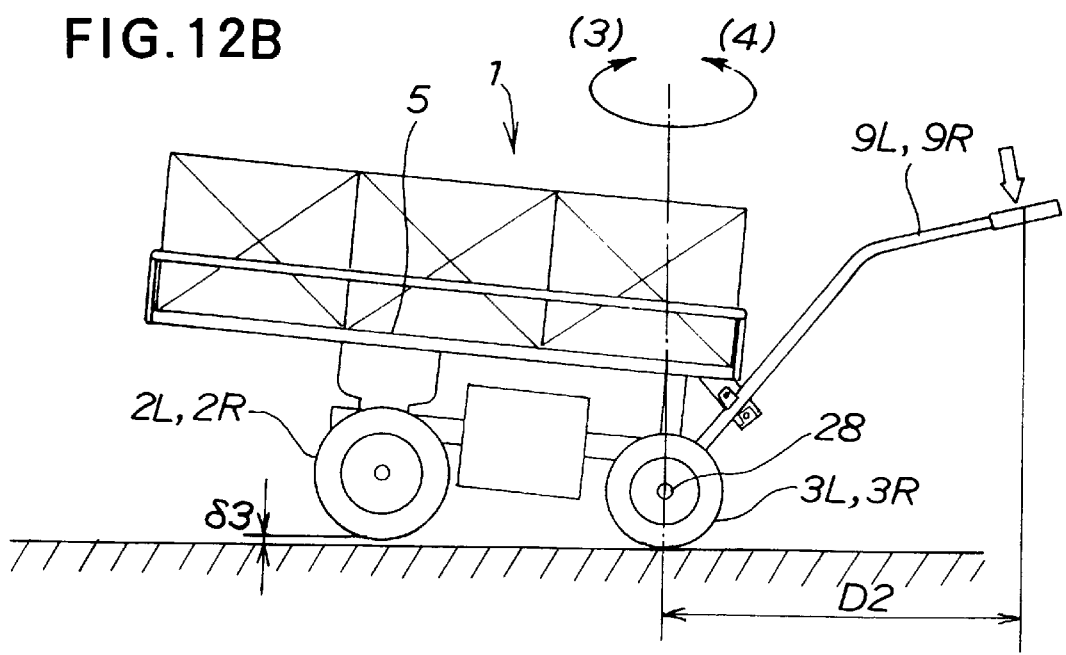

The following paragraphs describe a manner in which the electromotive cart is changed in direction by turning about the front wheels and a manner in which the electromotive cart is changed in direction by turning about the rear wheels, with reference to FIGS. 12A and 12B. Referring first to FIG. 12A, the direction of the cart 1 is changed by only lifting the grip handles 9L and 9R until the rear wheels 3L and 3R are raised to the distance δ2 from the ground and then turning the cart 1 only about the front wheels 2L and 2R in the direction of arrow (1) or (2). Because the grip handles 9L and 9R extend obliquely upward in the rearward direction of the cart 1, any directional changes of the cart 1 can be readily effected by the human operator by applying upward force and horizontal (i.e., perpendicular to the plane of the sheet of the drawing) force to the rear portion of the load carrier base 5. Particularly, because the distance D1 from the front wheels 2L and 2R to the grips of the handles 9L and 9R is great enough, even a relatively small horizontal force can produce a moment—(horizontal force)×(distance)— necessary for the turning of the cart 1. However, if the cart can not be turned about the front wheels due to a narrow inter-furrow space, then the turn may be carried out in the manner of FIG. 12B.

In FIG. 12B, the direction of the cart 1 is changed by pushing downward the grip handles 9L and 9R until the front wheels 2L and 2R are raised to a distance δ3 from the ground and then turning the cart 1 only about the rear wheels 3L and 3R in the direction of arrow (3) or (4). At that time, the front wheels 2L and 2R can be readily raised by leverage, because the rear wheels 3L and 3R are smaller in diameter than the front wheels 2L and 2R and the rear wheel axle 28 is located quite near the ground. Because the distance D2 from the rear wheels 3L and 3R to the grips of the handles 9L and 9R is smaller than the above-mentioned distance D1 from the front wheels 2L and 2R to the grips of the handles 9L and 9R, the moment necessary for the turning of the cart 1 can be made smaller. This is the reason why the distance between the outer surfaces of the rear wheels is chosen to be smaller than that of the front wheels in the embodiments as typically shown in FIG. 11. Thus, the force necessary for the horizontal turn can be made smaller. This way, the horizontal turn about the rear wheels can also be conducted with ease.

Figure 13:
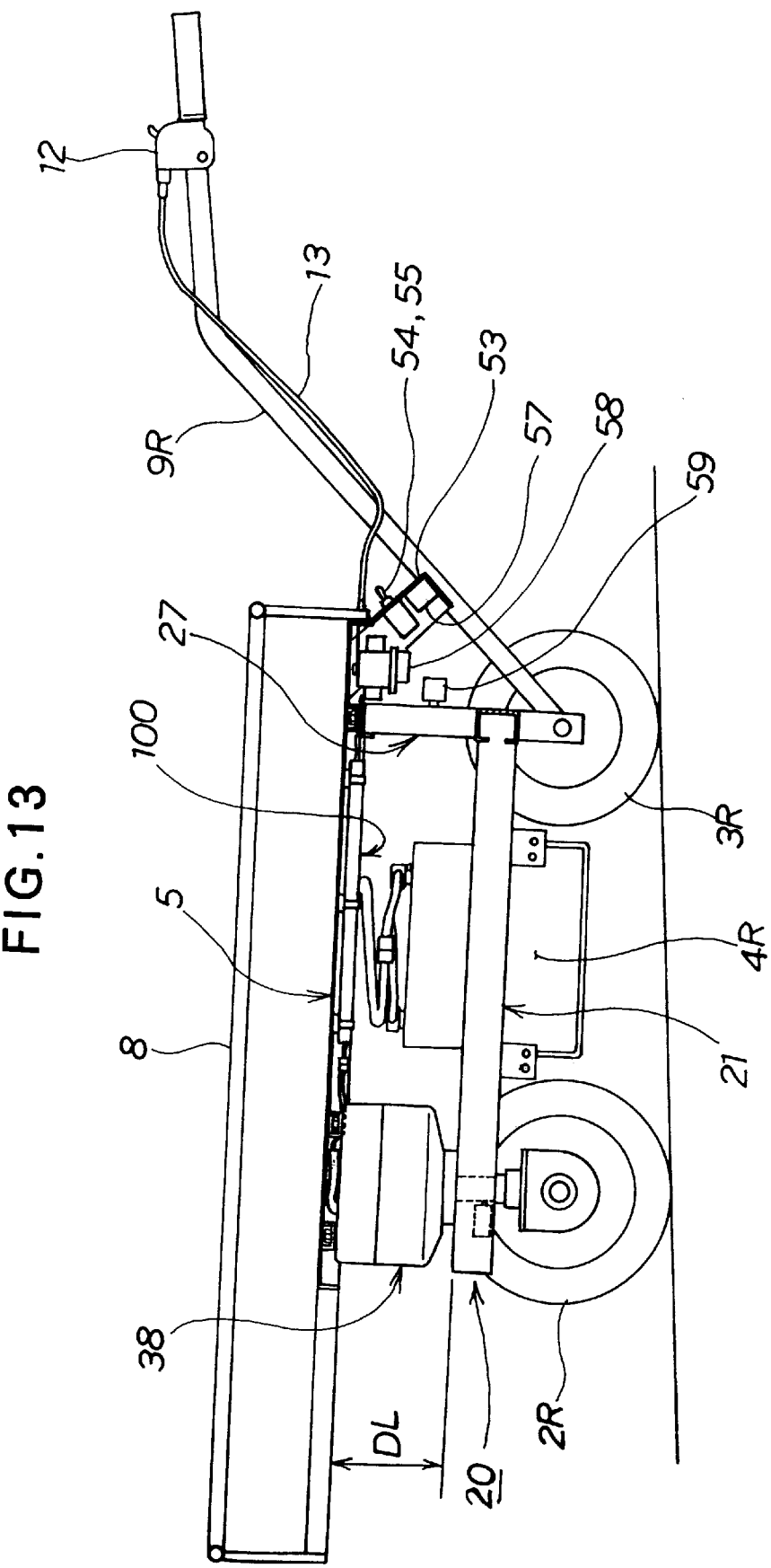
FIG. 13 is a schematic side view, partly in cross section, of an electromotive cart provided with a harness unit.

FIG. 13 is a schematic side view of an electromotive cart which is provided with a harness unit. In this electromotive cart, the load carrier base 5 is attached to the top of the main frame 21, with a predetermined distance DL, via the rear frame 27 and electric motor 38. Trunk harness 100 is attached to and extends along the underside of the load carrier base 5, and branch harness branching out from the trunk harness member 100 is connected via cable couplers with various electric elements employed in the electromotive cart. Reference numeral 13 represents a wire, one end of which is connected to the gear shifting lever 12 on the grip handle.

Figure 14:
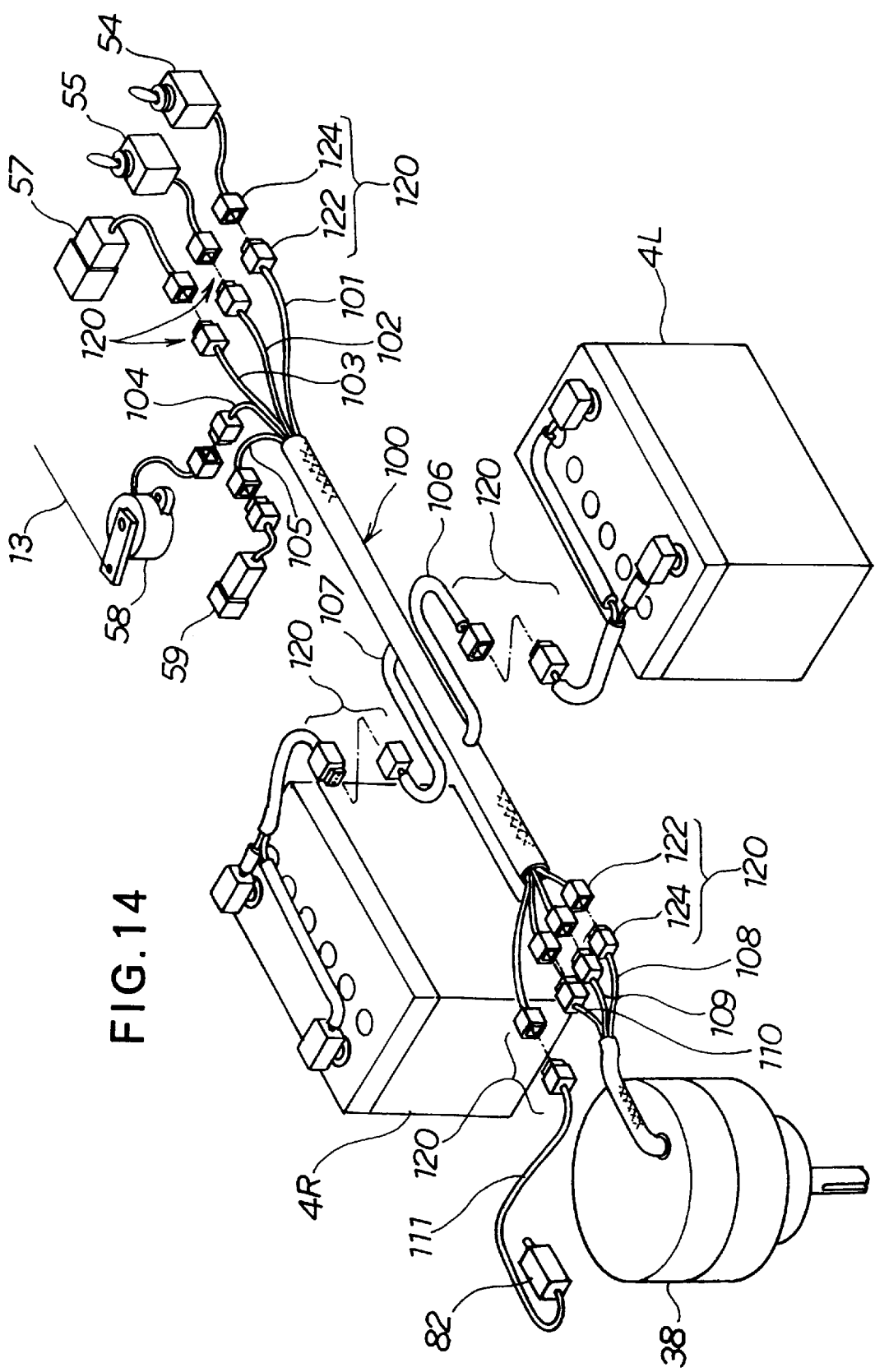
FIG. 14 is a perspective view illustrating positional relationships among various electric elements employed in the electromotive cart of FIG. 13.

FIG. 14 is a perspective view illustrating positional relationships among the various electric elements. One end of the trunk harness 100, which is a multi-core cable, is divided into: a branch harness member 101 connecting to the main switch 54; a branch harness member 102 connecting to the forward/rearward-travel shifting switch 55; a branch harness member 103 connecting to a relay box 57; a branch harness member 104 connecting to a potentiometer 58 for adjusting a voltage applied to the electric motor 38; and a branch harness member 105 connecting to a fuse box 59. Also, branch harness members 106 and 107, connecting to the two batteries 4L and 4R, respectively, extend centrally from the trunk harness 100.

The other end of the trunk harness 100 is divided into three branch harness members 108, 109 and 110 connecting to the electric motor 38, as well as a branch harness member 111 connecting to the brake switch 82.

The branch harness member 101 is electrically connected by inserting a plug 122 of a cable coupler 120 into a socket 124 of the main switch 54. Alternatively, the branch harness member 101 may have the socket 124 and the main switch 54 may have the plug 122, as long as the main switch 54 can be disconnectably connected with the main switch 54 via the cable coupler 120. The other branch harness members 102 to 111 are of the same construction as the branch harness member 101. The cable coupler 120 is waterproof.

A manner in which the trunk harness arranged in the above-mentioned manner is mounted is described below with reference to FIG. 15, which shows the load carrier base 5 and rails 8 placed in an upside-down state. First, in the upside-down state where the load carrier base 5 lies above the rails 8, the trunk harness 100 is placed centrally on the carrier base 5 along the longitudinal direction of the cart and fastened thereto by means of cable clamps 126. Then, the load carrier base 5 with the rails 8 is upturned, and placed on and bolted to the cross frame 31 and electric motor 38 assembled as shown in FIG. 2.

After that, the batteries 4L, 4R, main switch 54, forward/ rearward-travel shifting switch 55, relay box 57, potentiometer 58, fuse box 59 and brake switch 82 are mounted in place, and then the cable couplers 120 are connected in a predetermined manner. This completes the necessary assembly of the electromotive cart 1 shown in FIG. 1.

By being disposed over the main frame 21 as shown in FIG. 13, the trunk harness 100 is effectively protected, by the main frame 21, from muddy water or pebbles splashed or flicked from the ground.

What is claimed is:

1. A four-wheeled electromotive cart comprising:
   a body framework;
   a front-wheel axle rotatably supported by a front portion of said body framework;
   a pair of left and right front wheels fixed on said front-wheel axle;
   a pair of left and right rear wheels supported by a rear portion of said body framework;
   a load carrier base supported by an upper portion of said load carrier base obliquely upward in a rearward direction of said electromotive cart;
   a pair of batteries disposed below said load carrier base between said front wheels and said rear wheels in such a manner that said batteries are located along both sides of said body framework;
   a single electric motor driven by said batteries; and
   a driven mechanism, directly coupling said electric motor and said front-wheel axle, for directly conveying driving force from said electric motor to said left and right front wheels via the front-wheel axle, said driving mechanism including a relay shaft connected to an output shaft of said electric motor, a small-diameter bevel gear mounted on a lower end of said relay shaft, and a large-diameter bevel gear engaging with said small-diameter bevel gear, and wherein said driving mechanism drives said front-wheel axle that is spline-connected to said large-diameter bevel gear;

wherein said left and right rear wheels are each smaller in diameter than said left and right front wheels, a distance between outer side surfaces of said left and right front wheels is greater than a distance between outer side surfaces of said left and right rear wheels, and said left and right batteries are positioned so as not to project laterally beyond the outer side surfaces of said left and right front wheels; and wherein said electric motor is disposed in the vicinity of said front-wheel axle and located outside a space between said pair of left and right front wheels and said pair of left and right rear wheels at a higher position than said front-wheel axle, said electric motor having an axis extending perpendicular to an axis of said front-wheel axle.

2. An electromotive cart as recited in claim 1 wherein said electric motor is mounted in such a manner that an axis thereof aligns with a substantially vertical imaginary line extending perpendicularly through a longitudinal central portion of said front-wheel axle, a motor case containing said electric motor is located above said front-wheel axle and an output shaft of said electric motor directly connects with said front-wheel axle.

3. An electromotive cart as recited in claim 1 wherein said electric motor is mounted in such a manner that an axis thereof aligns with a slanted imaginary line extending upward in a forward direction of said electromotive cart perpendicularly through a longitudinal central portion of said front-wheel axle, a motor case containing said electric motor is located forward of said front-wheel axle and an output shaft of said electric motor directly connects with said front-wheel axle.

4. An electromotive cart as recited in claim 1 wherein said electric motor is mounted in such a manner that an axis thereof aligns with a substantially horizontal imaginary line extending perpendicularly through a longitudinal central portion of said front-wheel axis, a motor case containing said electric motor is located forward of said front-wheel axle and an output shaft of said electric motor directly connects with said front-wheel axle.

5. An electromotive cart as recited in claim 1 wherein said electric motor is mounted in such a manner that an axis thereof aligns with an imaginary line lying parallel to and offset by a predetermined distance upward from a substantially horizontal imaginary line that extends perpendicularly through a longitudinal central portion of said front-wheel axle, a motor case containing said electric motor is located forward of said front-wheel axle and an output shaft of said electric motor directly connects with said front-wheel axle.

6. An electromotive cart as recited in claim 1 wherein said electric motor is mounted in such a manner that an axis thereof aligns with a substantially vertical imaginary line extending perpendicularly through a longitudinal central portion of said front-wheel axle, a motor case containing said electric motor is located above said front-wheel axle and an output shaft of said electric motor directly connects with said front-wheel axle, and wherein said load carrier base is directly connected with said motor case.

7. A four-wheeled electromotive cart according to claim 1, wherein said load carrier base is supported by said upper portion of said body framework with a predetermined space left therebetween, said electric motor being attached to a front portion of said load carrier base, and wherein said four-wheeled electromotive cart further includes a control panel for controlling said electric motor, a trunk harness attached to and extending along an underside of said load carrier base, and a plurality of branch harness members branching out from said trunk harness for electrical connection with said batteries, electric motor and other electric elements of said four-wheeled electromotive cart via cable couplers.

\* \* \* \* \*